United States Patent
Cairns et al.

(10) Patent No.: US 9,866,990 B2
(45) Date of Patent: Jan. 9, 2018

(54) SYSTEM AND METHOD FOR SIMULTANEOUS WIRELESS CONTROL OF MULTIPLE PERIPHERAL DEVICES

(71) Applicants: Dustin Cairns, Deerfield, OH (US); Timothy Chen, Aurora, OH (US); Andrew Charles Hussey, Stow, OH (US)

(72) Inventors: Dustin Cairns, Deerfield, OH (US); Timothy Chen, Aurora, OH (US); Andrew Charles Hussey, Stow, OH (US)

(73) Assignee: TECHNICAL CONSUMER PRODUCTS, INC., Aurora, OH (US)

(*) Notice: Subject to any disclaimer, the term of this patent is extended or adjusted under 35 U.S.C. 154(b) by 239 days.

(21) Appl. No.: 14/289,175

(22) Filed: May 28, 2014

(65) Prior Publication Data
US 2015/0350810 A1    Dec. 3, 2015

(51) Int. Cl.
*H04W 4/00* (2009.01)
*H04L 12/28* (2006.01)
(Continued)

(52) U.S. Cl.
CPC ............ *H04W 4/008* (2013.01); *G08C 17/02* (2013.01); *H04L 12/282* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,185,513 B1 * | 2/2001 | Plettner | G01D 3/08 702/141 |
| 6,510,995 B2 | 1/2003 | Muthu et al. | |

(Continued)

FOREIGN PATENT DOCUMENTS

| | | |
|---|---|---|
| CN | 203233580 | 10/2013 |
| CN | 203313451 | 11/2013 |

(Continued)

OTHER PUBLICATIONS

Host Controller Interface Functional Specification, Bluetooth Specification Version 4.0 [vol. 2], p. 469.*
(Continued)

*Primary Examiner* — Yuwen Pan
*Assistant Examiner* — Zhitong Chen
(74) *Attorney, Agent, or Firm* — Thompson Hine LLP

(57) ABSTRACT

A system for controlling a plurality of peripheral devices includes a portable electronic device and a plurality of peripheral devices in wireless communication with the portable electronic device. The portable electronic device includes a processor configured to connect to each of the plurality of peripheral devices one at a time based on round-robin scheduling. The processor is configured to execute an instruction for searching for a broadcast signal transmitted from a selected one of the plurality of peripheral devices. The processor is configured to execute an instruction to wirelessly connect with the selected one of the plurality of peripheral devices. The processor is configured to execute an instruction to send a control signal to the selected one of the plurality of peripheral devices. The processor is configured to execute an instruction to terminate the connection between the portable electronic device and the selected one of the plurality of peripheral devices.

13 Claims, 6 Drawing Sheets

(51) Int. Cl.
   *H04W 74/06*    (2009.01)
   *G08C 17/02*    (2006.01)
   *H04L 12/863*   (2013.01)
   *H04W 76/02*    (2009.01)
   *H04W 8/00*     (2009.01)
   *H04W 84/20*    (2009.01)

(52) U.S. Cl.
   CPC ......... *H04L 47/6225* (2013.01); *H04W 8/005* (2013.01); *H04W 74/06* (2013.01); *H04W 76/023* (2013.01); *G08C 2201/93* (2013.01); *H04W 84/20* (2013.01)

(56) References Cited

U.S. PATENT DOCUMENTS

| | | | |
|---|---|---|---|
| 6,552,495 | B1 | 4/2003 | Chang |
| 6,596,977 | B2 | 7/2003 | Muthu et al. |
| 6,753,661 | B2 | 6/2004 | Muthu et al. |
| 8,084,958 | B2 | 12/2011 | Baaijens |
| 8,115,410 | B2 | 2/2012 | Baaijens et al. |
| 2003/0023601 | A1* | 1/2003 | Fortier, Jr. ........ G06F 17/30569 |
| 2006/0018319 | A1* | 1/2006 | Palin ....................... A63F 13/12 370/390 |
| 2006/0123421 | A1 | 6/2006 | Loboz |
| 2009/0300133 | A1 | 12/2009 | Basson |
| 2010/0253281 | A1 | 10/2010 | Li |
| 2011/0169606 | A1* | 7/2011 | Brandsma ............. G05B 15/02 340/9.1 |
| 2012/0009924 | A1 | 1/2012 | Lee |
| 2012/0087632 | A1* | 4/2012 | Mabuchi ................ H04N 5/783 386/235 |
| 2013/0028612 | A1 | 1/2013 | Ryan et al. |
| 2013/0052939 | A1 | 2/2013 | Anniballi et al. |
| 2014/0081466 | A1* | 3/2014 | Huapeng ............ H04L 12/2825 700/276 |
| 2015/0120000 | A1* | 4/2015 | Coffey ................ H04L 12/2803 700/13 |

FOREIGN PATENT DOCUMENTS

| | | | | |
|---|---|---|---|---|
| EP | 1223715 | A1 * | 7/2002 | ............. H04L 12/56 |
| EP | 1223715 | A1 * | 7/2002 | ............. H04L 12/56 |

OTHER PUBLICATIONS

Host Controller Interface Functional Specification, Bluetooth Specification Version 4.0 [vol. 2].*
Host Controller Interface Functional Specification, Bluetooth Specification Version 4.0 [vol. 2], p. 469 (Hereinafter BTSpec).*
Host Controller Interface Functional Specification, Bluetooth Specification Version 4.0.*
Wardle, D. A. "The time delay in human vision." The Physics Teacher 36.7 (1998): 442-444.*

* cited by examiner

SYSTEM AND METHOD FOR SIMULTANEOUS WIRELESS CONTROL OF MULTIPLE PERIPHERAL DEVICES

TECHNICAL FIELD

The present disclosure relates generally to a system and method for controlling multiple peripheral devices, and more particularly to a system and method of wirelessly controlling multiple peripheral devices simultaneously.

BACKGROUND

Wireless lighting control systems may utilize radio frequency (RF) communication to communicate control signals to an antenna element mounted in a light fixture. For example, a user may turn on, turn off, or dim a light using wireless control. Specifically, a user may use a portable electronic device such as, for example, a smartphone or tablet computer that includes wireless control capabilities in order to communicate with the antenna element located within the lighting fixture. For example, the portable electronic device may include Bluetooth® low energy (BLE) wireless capability in order to wirelessly communicate with one or more lighting fixtures.

A home, office, or any other building typically includes many light fixtures for illumination. A user may wish to simultaneously control two or more of the light fixtures using wireless control. For example, a user may wish to change the color, dim, turn on, or turn off all of the light fixtures in his or her living room at the same time. For security reasons, each individual lighting fixture needs to be paired to the portable electronic device before they can exchange data. Pairing occurs when one of the light fixtures and the portable electronic device become a trusted pair. To become a trusted pair, a specific discovery and authentication process should be completed. For example, the light fixtures and the portable electronic device may become a trusted pair by exchanging a protected security identification number, or passkey. Once a lighting fixture is paired with the portable electronic device, the two devices are now connected to one another. This means that the two devices may securely exchange data between one another.

A piconet physical channel is a network using BLE based technology protocols to allow a master device, such as the portable electronic device, to interconnect with multiple slave devices, such as the lighting fixtures. Piconet physical channels utilize frequency hopping. Specifically, each piconet physical channel includes a unique master device (e.g., the portable electronic device), where each master device has its own unique device address as well as its own clock. Therefore, each piconet physical channel will also have its own unique frequency hopping sequence. This means that when a connection between the master device and one of the slave devices is established, the clock and the unique device address of the master device may be transmitted to the slave device. The unique device address of the master device may be used to determine the sequence of frequency hops of the slave devices, and the clock of the master device may be used to determine the timing of the frequency hops of the slave devices.

Using the above-described approach, the slave devices within a piconet physical channel are able to avoid one another's transmission by persistently changing frequency channels. However, there are some drawbacks when utilizing this approach. This is because the timing of the frequency hops between the various slave devices is fixed. In particular, the timing of the frequency hop may be anywhere from about ten to twenty seconds in duration. This fixed duration may be an issue if a user wishes to simultaneously control two or more slave devices at about the same time, since it is impossible to control two lighting fixtures simultaneously. For example, if a user attempts to dim all of the lighting fixtures in his or her living room at once, each lighting fixture will actually dim one by one, in a sequential fashion. Thus, there exists a need in the art for improved, simultaneous control of wireless lighting fixtures.

SUMMARY

In one embodiment, a system for controlling a plurality of peripheral devices includes a portable electronic device and a plurality of peripheral devices in wireless communication with the portable electronic device. The portable electronic device includes a processor configured to connect to each of the plurality of peripheral devices one at a time based on round-robin scheduling. The processor is configured to execute an instruction for searching for a broadcast signal transmitted from a selected one of the plurality of peripheral devices. The processor is configured to execute an instruction to wirelessly connect with the selected one of the plurality of peripheral devices. The processor is configured to execute an instruction to send a control signal to the selected one of the plurality of peripheral devices. The processor is configured to execute an instruction to terminate the connection between the portable electronic device and the selected one of the plurality of peripheral devices.

In another embodiment, a lighting fixture is disclosed and comprises an antenna element, at least one lighting element configured to generate visible light, and a processor in signal communication with the antenna element. The processor is configured to execute an instruction for generating a broadcast signal that indicates that lighting fixture originates from a specific manufacturer.

In yet another embodiment, a method of controlling a plurality of peripheral devices is disclosed. The method includes providing a portable electronic device and a plurality of peripheral devices in wireless communication with the portable electronic device. The portable electronic device includes a processor configured to connect to each of the plurality of peripheral devices one at a time based on round-robin scheduling. The method includes executing an instruction by the processor of the portable electronic device to search for a broadcast signal transmitted from one of the plurality of peripheral devices. The method includes executing an instruction by the processor of the portable electronic device to wirelessly connect with the selected one of the plurality of peripheral devices. The method includes executing an instruction by the processor of the portable electronic device to send a control signal to the selected one of the plurality of peripheral devices. The method includes executing an instruction by the processor of the portable electronic device to terminate the connection between the portable electronic device and the selected one of the plurality of peripheral devices.

DETAILED DESCRIPTION

Figure 1:
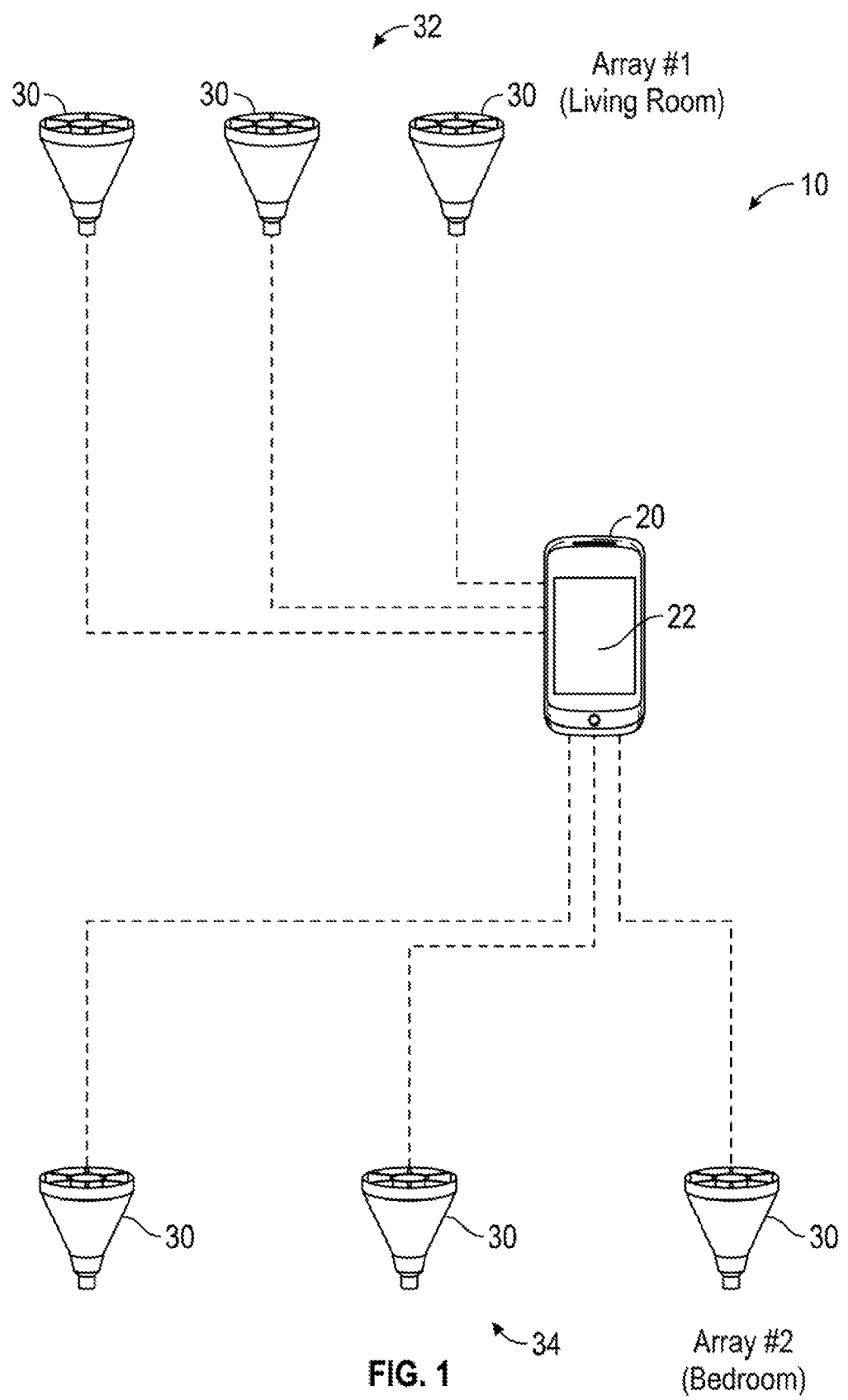
FIG. 1 is a schematic illustration of an exemplary wireless lighting control system.

The following detailed description will illustrate the general principles of the invention, examples of which are additionally illustrated in the accompanying drawings. In the drawings, like reference numbers indicate identical or functionally similar elements.

FIG. 1 is an exemplary schematic illustration of a wireless lighting control system 10. The wireless lighting control system 10 may include a portable electronic device 20 in wireless communication with a plurality of lighting fixtures 30. Specifically, each lighting fixture 30 may be part of a specific array. For example, in the embodiment as shown, a first array 32 and a second array 34 are illustrated. The arrays 32, 34 may represent the light fixtures located in a specific room of a home or office that may be controlled using the portable electronic device 20. For example, in one approach, the first array 32 could be all of the lighting fixtures 30 in a user's bedroom. The second array 34 may represent all of the lighting fixtures located in another room of a user's home, such as the user's dining room. Those skilled in the art will readily appreciate that the illustration in FIG. 1 is merely an illustrative example of the wireless lighting control system 10, and that any number of arrays having any number of lighting fixtures 20 may be used as well.

In one embodiment, the lighting fixtures 30 may each be any type of illumination device for emitting visible light, which includes an antenna element 40 (shown in FIG. 2) that is configured to send and receive radio frequency (RF) signals. For example, in one embodiment the antenna element 40 may be configured to send and receive a short-range RF signal such as, for example, a Bluetooth® low energy (BLE) signal. The lighting fixtures 30 may be any type of lighting fixture configured to emit visible light such as, but not limited to, an LED lamp, an incandescent lamp, a compact fluorescent lamp (CFL), or a gas-discharge lamp.

The portable electronic device 20 may be any type of portable electronic device that sends and receives RF signals. In particular, in one embodiment the portable electronic device 20 may be configured to wirelessly connect with the lighting fixtures 30 using a short-range RF signal, such as a BLE signal. The portable electronic device 20 may be, for example, a smartphone, a tablet, a laptop computer, a personal computer or a vehicle such as an automobile. The portable electronic device 20 may include a user interface that allows a user to enter input. The portable electronic device 20 may also include a display that generates an image visible to the user. In the embodiment as shown, the user interface and display are combined with one another as a touchscreen 22. However, it is to be understood that the embodiment as illustrated in the figures is merely exemplary in nature, and that a separate user interface and display may be used as well.

The portable electronic device 20 may be a master device that is used to control the lighting elements 30. For example, as described in greater detail below, the portable electronic device 20 may be used to control the color (e.g., red, blue, or green lighting), dimming, or power to the lighting elements 30. Specifically, the portable electronic device 20 may be used to provide generally seamless and relatively simultaneous control of all of the lighting fixtures 30 located in a specific one of the arrays 32, 34. In one illustrative embodiment, the portable electronic device 30 may be used to dim all of the lighting fixtures 30 located in the first array 32 at substantially the same time. Those skilled in the art will appreciate that although FIG. 1 illustrates a wireless lighting control system 10, the disclosure is not limited to lighting fixtures. Instead, the portable electronic device 30 may be used to provide relatively simultaneous control to any number of wireless peripheral devices in an array. For example, in one embodiment, the portable electronic device 20 may be used to control a speaker system having multiple speakers.

Figure 2:
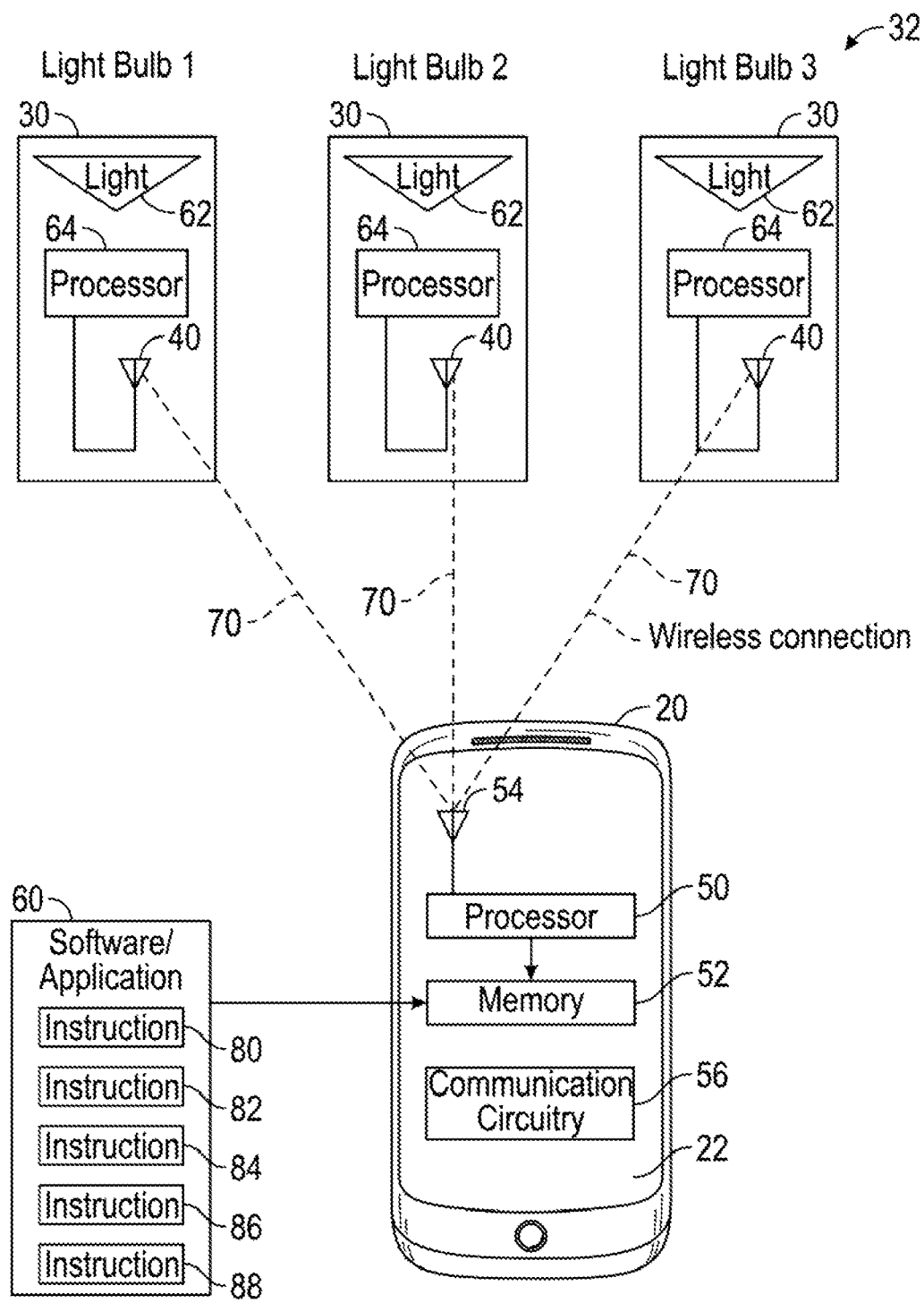
FIG. 2 is a schematic illustration of a portable electronic device and an array of lighting fixtures shown in FIG. 1.

Turning now to FIG. 2, the portable electronic device 20 includes a processor 50, memory 52, an antenna element 54 and communications circuitry 56. When the portable electronic device 20 is in operation, the processor 50 executes instructions stored within the memory 52, to communicate data to and from the memory 52, and to generally control operations of the portable electronic device 20 pursuant to the instructions. A processor may be any custom made or commercially available processor, a central processing unit (CPU), or generally any device for executing instructions.

The antenna element 54 may be in signal communication with the processor 50. Similar to the antenna element 40 of the lighting fixtures 30, the antenna element 54 may also be configured to receive a short-range RF signal such as, for example, a BLE signal. The communications circuitry 56 may be any type of circuitry operative to connect to a communications network and to transmit communications (e.g., data) from the portable electronic device 20 to other devices within a communications network. In one embodiment, an application or software 60 may be downloaded into the memory 52 of the portable electronic device 20. The software 60 may be used to enable wireless control of the lighting fixtures 30 by the portable electronic device 20, and is described in greater detail below.

FIG. 2 also illustrates each of the lighting fixtures 30 located within the first array 32. Each lighting fixture 30 includes one or more lighting elements 62, a processor 64, and the antenna element 40. The processor 64 may be in signal communication with the antenna element 40 and the lighting elements 62. The processor 64 may be used to control and deliver power to the lighting element 62. The lighting element 62 may be any type of device that generates visible light such as, for example, one or more light emitting diodes (LEDs) or a filament of an incandescent light.

The processor 64 of each lighting fixture 30 may be in communication with the portable electronic device 20 through a wireless connection 70. As discussed above, in one embodiment the wireless connection 70 may be any type of short-range RF connection such as, for example, BLE. At any given time, a specific one of the antenna elements 40 of one of the lighting fixtures 30 and the antenna element 54 of the portable electronic device 20 may be connected to one another through the wireless connection 70. It is to be understood that before the wireless connection 70 is established between a lighting fixture 30 and the portable electronic device 20, each lighting fixture 30 may need to be paired to the portable electronic device 20 first. Pairing occurs when one of the light fixtures 30 and the portable electronic device 20 become a trusted pair, where a specific discovery and authentication process are completed. For example, each light fixture 30 and the portable electronic device 20 may become a trusted pair by exchanging a protected security identification number, or passkey. Once a lighting fixture 30 is paired with the portable electronic device 20, the two devices may be intermittently connected to one another over the wireless connection 70. Specifically, each lighting fixture 30 may be intermittently connected to the portable electronic device 20 based on round-robin scheduling, which is described in greater detail below.

The processor 64 of each of the lighting fixtures 30 may include circuitry or control logic for sending an advertisement or broadcast signal over the wireless connection 70 to the processor 50 of the portable electronic device 20. In one exemplary embodiment, the broadcast signal may indicate that the lighting fixture 30 originates from a specific manufacturer. For example, the broadcast signal may indicate that the lighting fixture 30 is manufactured by Technical Consumer Products Inc., of Aurora, Ohio. Although data indicating a specific manufacturer is discussed, it is to be understood that the disclosure is not limited to a specific brand or manufacturer of the lighting fixture 30, and that other data may be used as well in the broadcast signal. In addition to the specific manufacturer, the broadcast signal also includes a device address, which may be referred to as a specific media access control address (MAC address) that is unique to the specific lighting fixture 30. The broadcast signal may also indicate the type of service being provided. For example, the light fixture 30 provides lighting service.

The memory 52 of the portable electronic device 20 may also store a list of unique device addresses or MAC addresses that are associated with each lighting fixture 30 in a specific array. For example, in the embodiment as shown in FIG. 2, the first array 32 includes three lighting fixtures 30, which are labelled as Light Bulb 1, Light Bulb 2, and Light Bulb 3. Each of the lighting fixtures 30 may include a unique MAC address. The memory 52 of the portable electronic device 20 may store the unique MAC address associated with each of the lighting fixtures 30 (e.g., Light Bulb 1, Light Bulb 2, and Light Bulb 3).

The software 60 stored in the memory 52 of the portable electronic device 20 may be configured to continuously wirelessly connect with one the lighting fixtures 30 at a time, based on round-robin scheduling. Specifically, the software 60 may assign substantially equal time slices to each of the lighting fixtures 30 located within the first array 32. During a time slice, the software 60 may wirelessly connect with a selected lighting fixture 30, determine whether a command selected by the portable electronic device 20 has been selected by a user, and send a control signal to the selected lighting fixture 30. Specifically, the software 60 stored in the memory 52 of the portable electronic device 20 may include a plurality of instructions 80, 82, 84, 86 and 88 stored therein that are executable by the processor 50 during each time slice. In one embodiment, the time slice may be about 15 milliseconds, however, those skilled in the art will appreciate that longer or shorter time slices may be used as well. In one approach, the time slice may range from about fifteen to about eighty milliseconds. In particular, it is to be understood that a longer time slice may be used so long as the portable electronic device 20 may connect to each lighting fixture 30 and control lighting such that a user observes a relatively seamless and substantially simultaneous control of the lighting fixtures 30.

Continuing to refer to FIG. 2, the processor 50 of the portable electronic device 20 may execute instruction 80, which searches for the broadcast signal from a specific lighting fixture 30. For purposes of explanation, the processor 50 will be described as searching for the broadcast signal from Light Bulb 1. The processor 50 of the portable electronic device 20 may then execute instruction 82, which establishes a connection between Light Bulb 1 and the portable electronic device 20 using the wireless connection 70. The processor 50 of the portable electronic device 20 may also receive the broadcast signal from Light Bulb 1.

Figure 3:
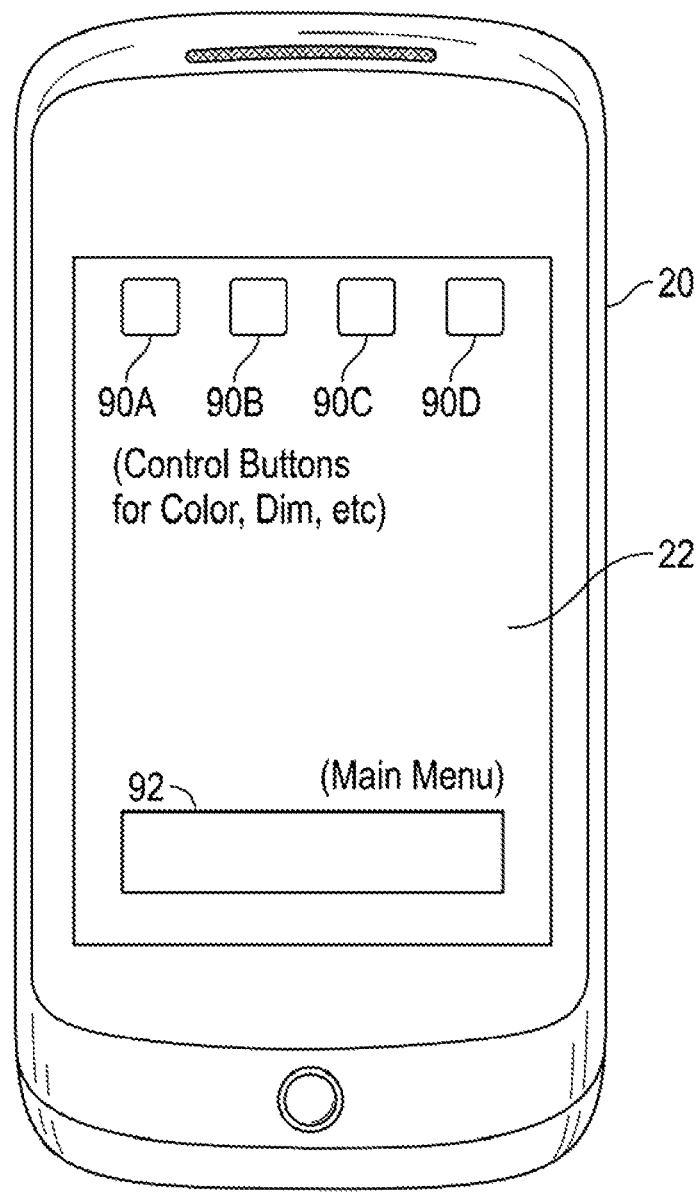
FIG. 3 is an illustration of the portable electronic device shown in FIG. 1.

Once the wireless connection 70 between Light Bulb 1 and the portable electronic device 20 is established, the processor 50 of the portable electronic device 20 may execute instruction 84. The instruction 84 determines if a user has selected a specific lighting control. For example, referring to FIG. 3, the touchscreen 22 may display a plurality of control buttons 90A-90D, as well as a main menu button 92. The control buttons 90A-90D may be selected by a user in order to change color, dim, turn on, or turn off all of the lighting fixtures 30 in the first array 32.

The selection of one or more control buttons 90A-90D may prompt the execution of instruction 86. Referring to FIG. 2, instruction 86 causes the processor 50 to send the control signal through the wireless connection 70 and to Light Bulb 1. However, it is to be understood that the control signal is only sent if the first lighting fixture within an array sent the broadcast signal. For example, in the embodiment as shown in FIG. 2, the first lighting fixture 30 in the first array 32 is Light Bulb 1. If Light Bulb 2 or Light Bulb 3 sends the broadcast signal, then the instruction will not cause the processor 50 to send the control signal until the portable electronic device 20 is connected to the first lighting fixture 30.

The control signal may include several piece of data, namely the MAC address of the specific lighting fixture 30, the protected security identification number passkey used during pairing, and the specific command selected by the control buttons 90A-90D (e.g., change color, dim, etc.). Once Light Bulb 1 receives the control signal sent by the portable electronic device 20, the processor 64 of Light Bulb 1 may then control and deliver power to the lighting element 62 accordingly. Specifically, the processor 64 may then control and deliver power according to the specific command selected by the control buttons 90A-90D (e.g., change color, dim, etc.).

Once the processor 50 of Light Bulb 1 sends the control signal through the wireless connection 70 and to one of the lighting fixtures 30 and the time slice is complete, the processor 50 may then execute instruction 88. Instruction 88 disconnects or terminates the wireless connection 70 between the specific lighting fixture 30 and the portable electronic device 20 (e.g., Light Bulb 1). It is to be understood that since instructions 80, 82, 84, 86, and 88 are carried out using round-robin scheduling, if by chance any of the instructions are unable to complete within the assigned time slice, then the wireless connection 70 will still be terminated. As soon as the wireless connection 70 is terminated, the processor 50 may then loop back to instruction 80, and connects with another lighting fixture 30 located within the first array 32. For example, in the embodiment as shown in FIG. 2, the next lighting fixture 30 would be Light Bulb 2.

Figure 4:
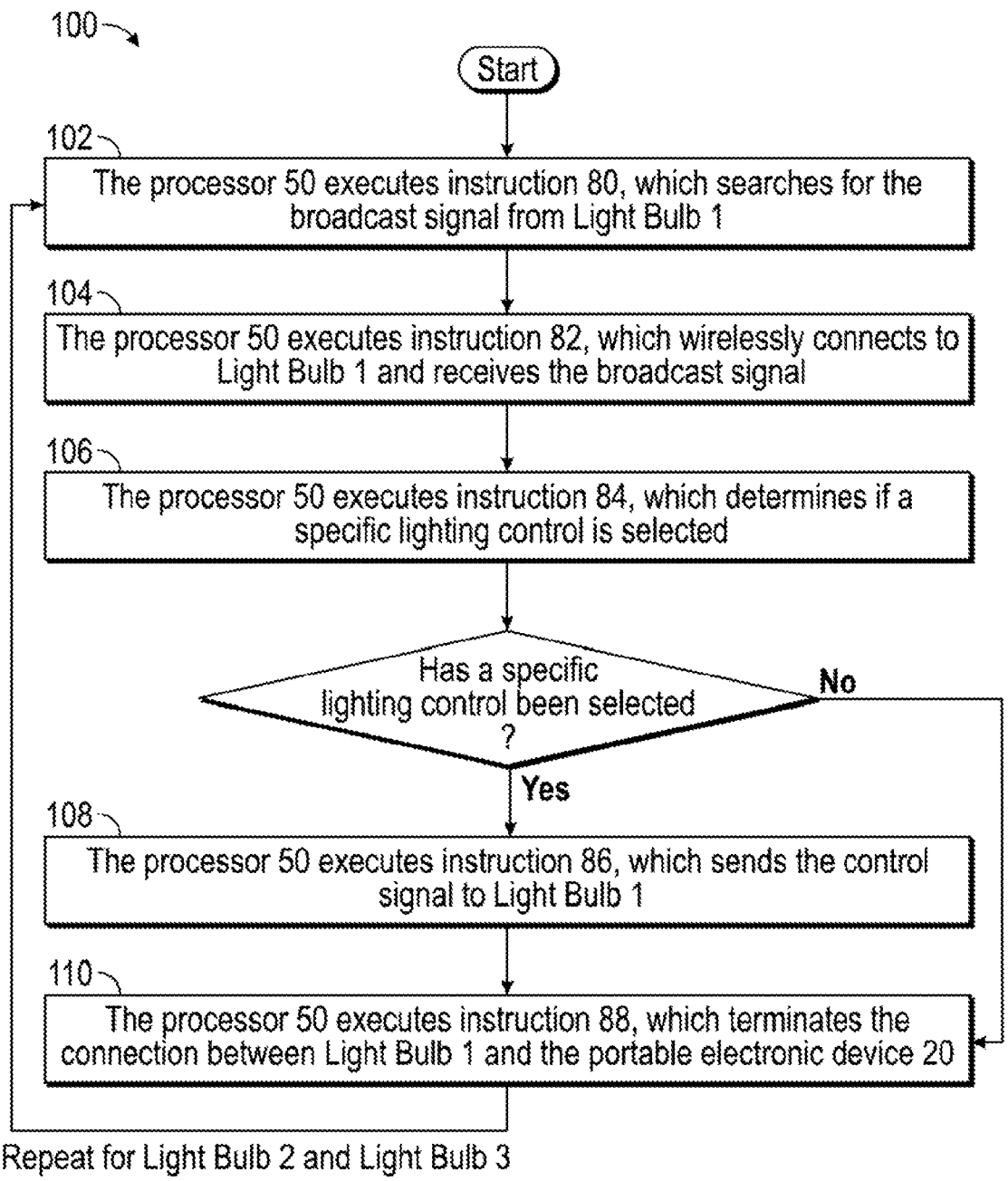
FIG. 4 is an exemplary process flow diagram illustrating an exemplary method of controlling the lighting fixtures shown in FIG. 2.

FIG. 4 is an exemplary process flow diagram illustrating a method 100 of controlling each of the lighting fixtures 30 within the first array 32. The method 100 may be used to provide generally seamless and relatively simultaneous control of all of the lighting fixtures 30 located in a specific array. Referring generally to FIGS. 1-4, the method 100 may begin at block 102, where the processor 50 of the portable electronic device 20 may execute instruction 80, which searches for the broadcast signal from Light Bulb 1. The method 100 may then proceed to block 104.

In block 104, the processor 50 of the portable electronic device 20 executes instruction 82, which establishes a connection between Light Bulb 1 and the portable electronic device 20 using the wireless connection 70. The method 100 may then proceed to block 106.

In block 106, the processor 50 of the portable electronic device 20 may execute instruction 84, which determines if a user has selected the specific lighting control. For example, referring to FIG. 3, the touchscreen 22 may display a plurality of control buttons 90A-90D, as well as a main menu button 92. The control buttons 90A-90D may be selected by a user in order to change color, dim, turn on, or turn off all of the lighting fixtures 30 in the first array 32. In the event no specific lighting control is selected, method 100 may proceed to block 110. However, if a specific lighting control has been selected, then method 100 may proceed to block 108.

In block 108, the processor 50 executes instruction 86, which sends the control signal through the wireless connection 70 and to the specific lighting fixture 30 that sent the broadcast signal (e.g., Light Bulb 1). Method 100 may then proceed to block 110.

In block 110, the processor 50 executes instruction 88, which terminates the wireless connection 70 between the specific lighting fixture 30 and Light Bulb 1. As soon as the wireless connection 70 is terminated, the processor 50 may then loop back to instruction 80, and connects with Light Bulb 2.

Figure 5:
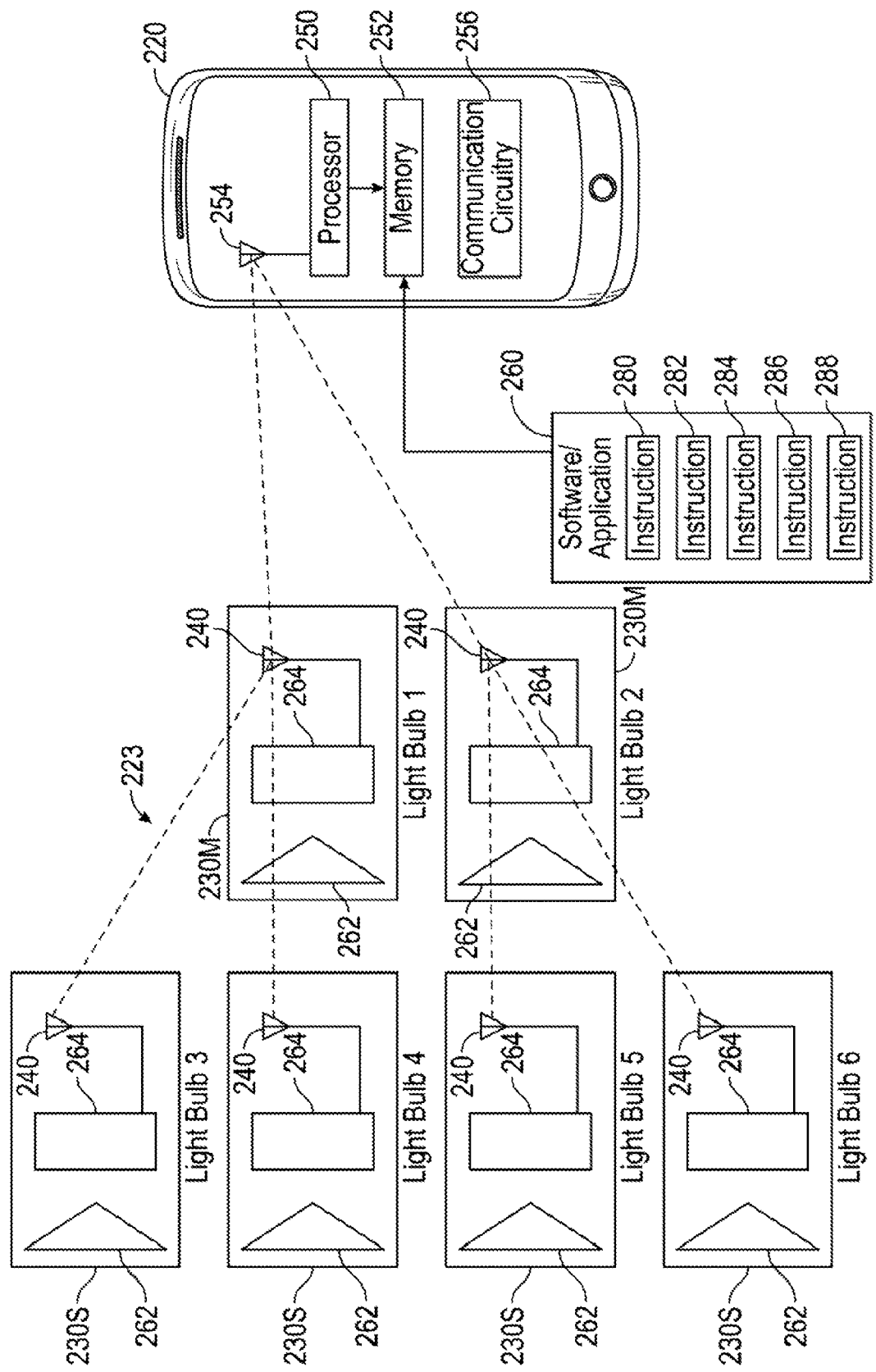
FIG. 5 is a schematic illustration of an alternative embodiment of a wireless lighting control system.

FIG. 5 is an alternative embodiment of a wireless lighting control system 210. The wireless lighting control system 210 may include a portable electronic device 220 that is in wireless communication with a plurality of master lighting fixtures 230M. Specifically, each master lighting fixture 230M may be in wireless communication with the portable electronic device 220 by a wireless connection 270. Similar to the embodiment as described above and illustrated in FIGS. 1-4, in one embodiment the wireless connection 270 may be any type of short-range RF connection such as, for example, BLE.

In the embodiment as shown in FIG. 5, the wireless lighting control system 210 also includes a plurality of slave lighting fixtures 230S. The slave lighting fixtures 230S may be in communication with one of the master lighting fixtures 230M through the wireless connection 270. For example, in the embodiment as shown in FIG. 5, an array 232 includes six lighting fixtures 30, which are labelled as Light Bulb 1, Light Bulb 2, Light Bulb 3, Light Bulb 4, Light Bulb 5, and Light Bulb 6. Light Bulb 1 is connected to Light Bulbs 3 and 4, and Light Bulb 2 is connected to Light Bulbs 5 and 6. However, it is to be understood that in an alternative embodiment, the slave lighting fixtures 230S may be in communication with all of the master lighting fixtures 230M through the wireless connection 270. For example, Light Bulb 1 may be connected to Light Bulbs 3-6. Additionally, Light Bulb 2 may also be connected to Light Bulbs 3-6.

The portable electronic device 220 includes a processor 250, memory 252, an antenna element 254 and communications circuitry 256. An application or software 260 may be downloaded into the memory 252 of the portable electronic device 220. Each lighting fixture 230 includes one or more lighting elements 262, a processor 264, and an antenna element 240. The processor 264 of each master lighting fixture 230M may be in communication with the portable electronic device 220 through the wireless connection 270. At any given time, a specific one of the antenna elements 240 of one of the master lighting fixtures 230M and the antenna element 254 of the portable electronic device 220 may be connected to one another through the wireless connection 270.

In the embodiment as shown in FIG. 5, the processor 264 of each of the master lighting fixtures 230M may include circuitry or control logic for sending the broadcast signal over the wireless connection 270 to the processor 250 of the portable electronic device 220. Similar to the embodiment as described above and illustrated in FIGS. 2-4, the memory 252 of the portable electronic device 220 may also store a list of unique MAC addresses that are associated with each lighting fixture 230 in a specific array.

The software 260 stored in the memory 252 of the portable electronic device 220 may be configured to continuously wirelessly connect with only the master lighting fixtures 230M one at a time, based on round-robin scheduling. Specifically, similar to the embodiment as described above and shown in FIGS. 2-4, the software 260 may assign substantially equal time slices to each of the lighting fixtures 230 located within the array 230. Continuing to refer to FIG. 5, the processor 250 of the portable electronic device 220 may execute instruction 280, which searches for the broadcast signal from a specific one of the master lighting fixture 230M. For purposes of explanation, the processor 250 will be described as searching for the broadcast signal from Light Bulb 1. The processor 250 of the portable electronic device 220 may then execute instruction 282, which establishes a connection between Light Bulb 1 and the portable electronic device 220 using the wireless connection 270. The processor 250 of the portable electronic device 20 may also receive the broadcast signal from Light Bulb 1.

Once the wireless connection 270 between a specific one of the lighting fixtures 230 and the portable electronic device 220 is established, the processor 250 of the portable electronic device 220 may execute instruction 284. The instruction 284 determines if a user has selected the specific lighting control, which is described in detail above. The selection of the specific lighting control may prompt the execution of instruction 286. Instruction 286 causes the processor 250 of the portable electronic device 220 to send the control signal through the wireless connection 270 and to the master lighting fixture 230M that sent the broadcast signal (e.g., Light Bulb 1).

In the embodiment as shown in FIG. 5, the control signal may include several pieces of data. Specifically, the control signal may include a list of the MAC address of all of the lighting fixtures 230 in the array 232 (e.g., Light Bulbs 1-6) that are to be controlled, the protected security identification number passkey used during pairing, and the specific lighting control command (e.g., change color, dim, etc.). Once the specific master lighting fixture 230M receives the control signal, the processor 264 of the master lighting fixture 230M may first determine if the control signal sent from the portable electronic device 220 contains the associated MAC address. For example, Light Bulb 1 determines if the control signal contains the unique MAC address associated with Light Bulb 1. If the control signal contains this information, then the processor 264 of Light Bulb 1 may control and deliver power to the associated lighting element 262 accordingly. Light Bulb 1 may also perform a sequence to determine if any of the slave lighting fixtures 230S (e.g., Light Bulbs 3 and 4) should be controlled as well, which is described in greater detail below.

Once the processor 250 sends the control signal through the wireless connection 270 and to one of the master lighting fixtures 230M and the time slice is complete, the processor 250 may then execute instruction 288. Instruction 288 disconnects or terminates the wireless connection 270 between the specific master lighting fixture 230 and the portable electronic device 220 (e.g., Light Bulb 1).

After Light Bulb 1 receives the control signal sent by the portable electronic device 220, the processor 264 of Light Bulb 1 may then execute an instruction that removes its MAC address from the list in the control signal that was sent. The processor 264 of Light Bulb 1 may then check the control signal to determine if there are any remaining MAC addresses in the list. For example, if the control signal contains the MAC addresses associated with Light Bulbs 1-6, then the processor 264 of Light Bulb 1 may remove the MAC address unique to Light Bulb 1. The processor 264 of Light Bulb 1 may then determine that the control signal still includes MAC addresses associated with Light Bulbs 2-6.

If the processor 264 of Light Bulb 1 determines that there is at least one MAC address remaining in the list of the control signal, then the processor 264 switches from slave control mode (where Light Bulb 1 is controlled by the portable electronic device 220) and into a master control mode. In master control mode, the processor 264 of Light Bulb 1 may execute an instruction which searches for the broadcast signal from one of the slave lighting fixtures 230S connected to Light Bulb 1 through the wireless connection 270. For example, in the embodiment as illustrated, Light Bulb 1 may receive the broadcast signal from Light Bulb 3. The processor 264 of Light Bulb 1 may then execute an instruction which establishes a connection between Light Bulb 1 and Light Bulb 3 using the wireless connection 270. The processor 264 of Light Bulb 1 may also receive the broadcast signal from Light Bulb 3.

Once the wireless connection 270 between Light Bulb 1 and Light Bulb 3 is established, the processor 264 of the Light Bulb 1 may then execute an instruction that sends the control signal to Light Bulb 3. For example, in the embodiment as illustrated, Light Bulb 1 may send the control signal to Light Bulb 3. Once the processor 264 sends the control signal through the wireless connection 270 and to Light Bulb 3 and the time slice is complete, the processor 264 may then execute an instruction to disconnect or terminate the wireless connection 270 between the specific master lighting fixture 230M and the slave lighting fixture 230S (e.g., between Light Bulb 1 and Light Bulb 3).

Those skilled in the art will readily appreciate that another layer of slave devices may be included as well. Specifically, in one embodiment the wireless lighting control system 210 may include one or more slave lighting fixtures that are in wireless communication with the slave lighting fixtures 230S.

Figure 6:
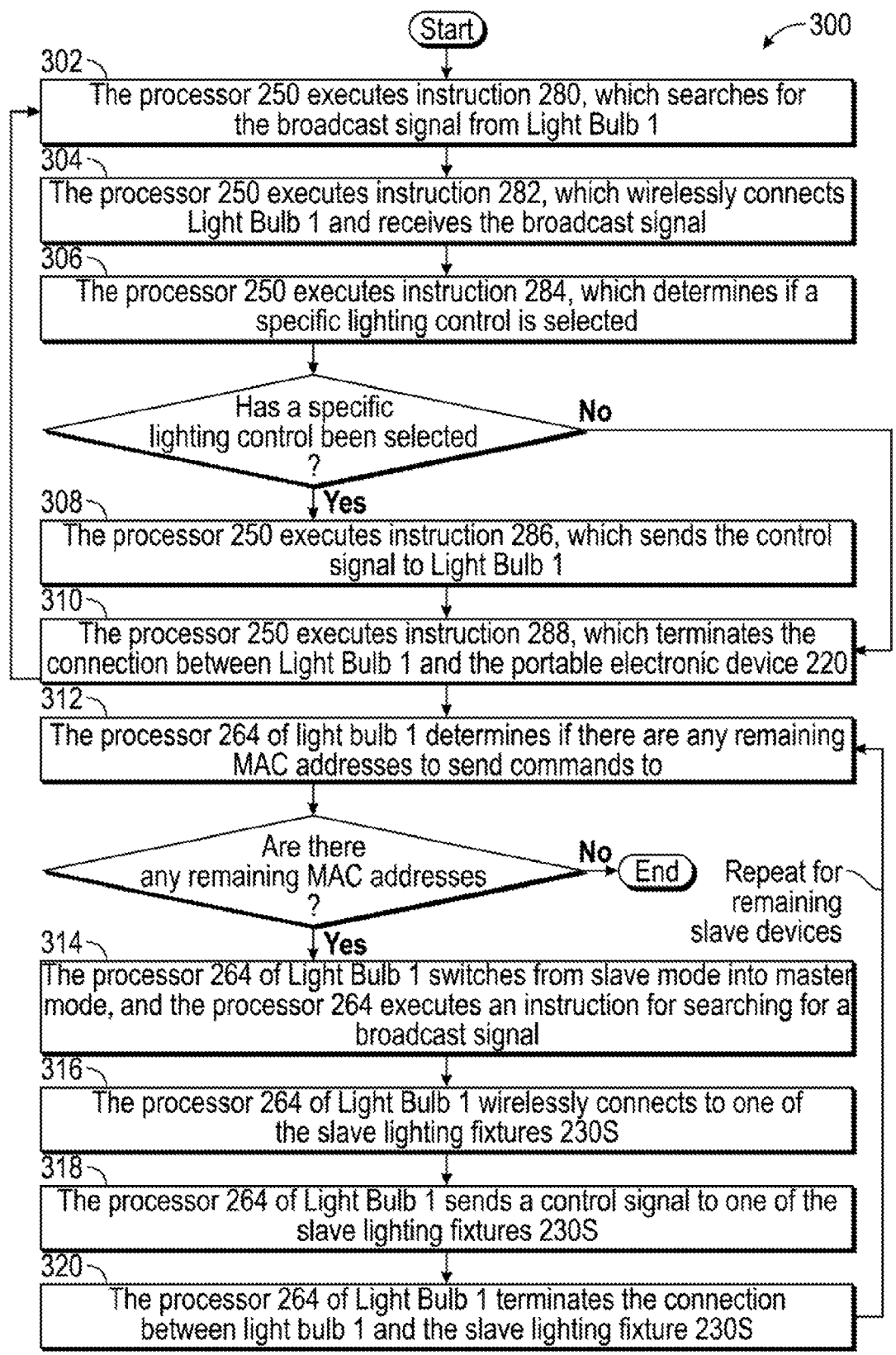
FIG. 6 is an exemplary process flow diagram illustrating an exemplary method of controlling the lighting fixtures shown in FIG. 5.

FIG. 6 is an exemplary process flow diagram illustrating a method 300 of controlling each of the master lighting fixtures 230M and the slave lighting fixtures 230S. The method 300 may be used to provide generally seamless and relatively simultaneous control of all of the lighting fixtures 230 located in a specific array. Moreover, those skilled in the art will readily appreciate that the process as described in method 300 may result in a smaller, more responsive wireless lighting control system 210. This is because the wireless lighting control system 210 includes a smaller network of master lighting fixtures 230M that the portable electronic device 220 connects to using round-robin scheduling.

Referring generally to FIGS. 5-6, the method 300 may begin at block 302, where the processor 250 of the portable electronic device 220 executes instruction 280. Instruction 280 searches for the broadcast signal from the specific lighting fixture 230 (e.g., Light Bulb 1). The method 300 may then proceed to block 304.

In block 304, the processor 250 of the portable electronic device 220 may then execute instruction 282, which establishes a connection between Light Bulb 1 and the portable electronic device 220 using the wireless connection 270. The processor 250 of the portable electronic device 20 may also receive the broadcast signal from Light Bulb 1. The method 300 may then proceed to block 306.

In block 306, the processor 250 of the portable electronic device 220 may execute instruction 284. The instruction 284 determines if a user has selected the specific lighting control, which is described in detail above. In the event no specific lighting control is selected, method 300 may proceed to block 310. However, if a specific lighting control has been selected, then method 300 may proceed to block 308.

In block 308, the processor 250 of the portable electronic device 220 executes instruction 286, which sends the control signal through the wireless connection 270 and to Light Bulb 1. Light Bulb 1 may perform a sequence to determine if any of the slave lighting fixtures 230S (e.g., Light Bulbs 3 and 4) should be controlled as well, which is described in blocks 312-320). The method 300 may then proceed to block 310.

In block 310, the processor 250 of the portable electronic device 220 may then execute instruction 288. Instruction 288 disconnects or terminates the wireless connection 270 between Light Bulb 1 and the portable electronic device 220. As soon as the wireless connection 270 is terminated, the processor 250 may then loop back to instruction 280, and connects with Light Bulb 2. The method 300 may then proceed to block 312.

In block 312, if the processor 264 of Light Bulb 1 determines if there is at least one MAC addresses remaining in the list of the control signal to send a command to. In the event there is not at least one MAC address remaining in the list of the control signal, then the method 300 may terminate. However, if there is at least one MAC address remaining, then method 300 may proceed to block 314.

In block 314, the processor 264 switches from slave control mode and into the master control mode. In master control mode, the processor 264 of Light Bulb 1 may execute an instruction which searches for the broadcast signal from one of the slave lighting fixtures 230S connected to Light Bulb 1 through the wireless connection 270. For example, in the embodiment as illustrated, Light Bulb 1 may receive the broadcast signal from Light Bulb 3. The method 300 may then proceed to block 316.

In block 316, the processor 264 of Light Bulb 1 may then execute an instruction which establishes a connection between Light Bulb 1 and a specific one of the slave lighting fixtures 230S (e.g., Light Bulb 3) using the wireless connection 270. The processor 264 of Light Bulb 1 may also receive the broadcast signal from Light Bulb 3. The method 300 may then proceed to block 318.

In block 318, the processor 264 of the Light Bulb 1 may execute an instruction that sends the control signal to Light Bulb 3. The method 300 may then proceed to block 320.

In block 320, the processor 264 may then execute an instruction to disconnect or terminate the wireless connection 270 between Light Bulb 1 and Light Bulb 3. The method 300 may then loop back to block 312, and repeat.

Referring generally to the FIGS. 1-6, the disclosed wireless lighting control systems 10, 210 may provide generally seamless and relatively simultaneous control of all of the lighting fixtures located in an array. In contrast, the wireless lighting control systems currently available do not typically provide simultaneous control of multiple lighting fixtures in an array. For example, if a user attempts to dim all of the lighting fixtures in a room at once, each lighting fixture will actually dim one by one, in a sequential fashion. The disclosed wireless lighting control systems 10, 210 overcome this issue by continuously wirelessly connecting with one lighting fixtures at a time for only a relatively short time slice, which in turn illuminates all of the lighting fixtures in an array at almost the same time.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A system for controlling a plurality of lighting fixtures arranged in an array, comprising:
    a portable electronic device for wireless communication with the plurality of lighting fixtures, wherein the portable electronic device includes a processor to continuously wirelessly connect to each of the plurality of lighting fixtures, one at a time, based on round-robin scheduling, wherein the processor of the portable electronic device assigns equal time slices to each of the plurality of lighting fixtures that range in time between about fifteen to about eighty milliseconds such that the portable electronic device connects to each of the plurality of lighting fixtures one by one, but appears to be simultaneously controlling the plurality of lighting fixtures when observed by a user, the processor:
    executes an instruction for searching for a broadcast signal transmitted from a selected one of the plurality of lighting fixtures;
    executes an instruction to wirelessly connect with the selected one of the plurality of lighting fixtures;
    executes an instruction to send a control signal to the selected one of the plurality of lighting fixtures, the control signal representing a first command;
    executes an instruction to terminate the connection between the portable electronic device and the selected one of the plurality of lighting fixtures; and
    executes an instruction to connect to a second one of the plurality of lighting fixtures based on the round-robin scheduling, wherein the control signal sent to the second one of the plurality of lighting fixtures represents a second command, and wherein the first command is the same as the second command.

2. The system as recited in claim 1, wherein the broadcast signal indicates that the selected one of the plurality of lighting fixtures originates from a specific manufacturer.

3. The system as recited in claim 2, wherein the broadcast signal includes a device address that is unique to the selected one of the plurality of lighting fixtures.

4. The system as recited in claim 1, wherein the control signal includes a device address that is unique to the selected one of the plurality of lighting fixtures, a protected security identification number passkey used during pairing, and a specific command that is selected by a user.

5. The system as recited in claim 1, further comprising a plurality of slave lighting fixtures, wherein each of the plurality of slave lighting fixtures are in wireless communication with one of the plurality of lighting fixtures.

6. The system as recited in claim 5, wherein the selected one of the plurality of lighting fixtures includes a peripheral processor, and wherein the peripheral processor switches from a slave control mode and into a master control mode based on determining there is at least one device address remaining in a list of device address contained in the control signal.

7. The system as recited in claim 6, wherein the peripheral processor executes an instruction which searches for a second broadcast signal sent from one of the plurality of slave lighting fixtures.

8. The system as recited in claim 1, wherein the portable electronic device is one of a smartphone, a tablet, a laptop computer, a personal computer or a vehicle.

9. A method of controlling a plurality of lighting fixtures, comprising:
    providing a portable electronic device in wireless communication with a plurality of lighting fixtures, wherein the portable electronic device includes a processor for continuously wirelessly connecting to each of the plurality of lighting fixtures one at a time based on round-robin scheduling;
    assigning equal time slices to each of the plurality of lighting fixtures by the processor of the portable electronic device that range in time between about fifteen to about eighty milliseconds such that the portable electronic device connects to each of the plurality of lighting fixtures one by one such that the plurality of lighting fixtures appear to be simultaneously controlled by the portable electronic device when observed by a user;
    executing an instruction by the processor of the portable electronic device to search for a broadcast signal transmitted from one of a selected one of the plurality of lighting fixtures;
    executing an instruction by the processor of the portable electronic device to wirelessly connect with the selected one of the plurality of lighting fixtures;
    executing an instruction by the processor of the portable electronic device to send a control signal to the selected one of the plurality of lighting fixtures, the control signal representing a first command;
    executing an instruction by the processor of the portable electronic device to terminate the connection between the portable electronic device and the selected one of the plurality of lighting fixtures; and
    executing an instruction to connect to a second one of the plurality of lighting fixtures based on the round-robin scheduling, wherein the control signal sent to the second one of the plurality of lighting fixtures represents a second command, and wherein the first command is the same as the second command.

10. The method as recited in claim 9, wherein the broadcast signal indicates that the selected one of the plurality of lighting fixtures originates from a specific manufacturer.

11. The method as recited in claim 9, further comprising a plurality of slave lighting fixtures, wherein each of the plurality of slave lighting fixtures are in wireless communication with one of the plurality of lighting fixtures.

12. The method as recited in claim 11, wherein the selected one of the plurality of lighting fixtures includes a peripheral processor, and wherein the peripheral processor switches from a slave control mode and into a master control mode based on determining there is at least one device address remaining in a list of device address contained in the control signal.

13. The system as recited in claim 1, wherein the first command of the control signal represents one of changing color, dimming, and supplying power to the lighting fixtures.

* * * * *